United States Patent
Wang (10) Patent No.: US 7,515,582 B2
(45) Date of Patent: Apr. 7, 2009

(54) SYNCHRONIZATION METHOD AND APPARATUS FOR OFDM SYSTEMS

(75) Inventor: Hung-Hsiang Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 614 days.

(21) Appl. No.: 11/246,732

(22) Filed: Oct. 8, 2005

(65) Prior Publication Data

US 2007/0025457 A1 Feb. 1, 2007

(30) Foreign Application Priority Data

Jul. 28, 2005 (TW) ............................... 94125561 A (51) Int. Cl.
*H04J 3/06* (2006.01)
(52) U.S. Cl. ....................... 370/350; 375/354
(58) Field of Classification Search ................. 375/354, 375/342; 370/350
See application file for complete search history.

(56) References Cited

U.S. PATENT DOCUMENTS

| | | | |
|---|---|---|---|
| 5,991,289 A * | 11/1999 | Huang et al. | 370/350 |
| 6,055,281 A * | 4/2000 | Hendrickson et al. | 375/329 |
| 6,421,401 B1 | 7/2002 | Palin | 375/343 |
| 2004/0208269 A1 | 10/2004 | Chen et al. | 375/354 |

* cited by examiner

*Primary Examiner*—David C Payne
*Assistant Examiner*—Tanmay K Shah (57) ABSTRACT

A synchronization apparatus and method for an OFDM system includes four portions: delay conjugate multiplication, phase processing, delay moving sum and minimum value detection. The invention performs the correlation phase operation and finds out the location of abnormal change for the phase difference of the output signal. The location is used for the reference of symbol synchronization. It overcomes the problems of incorrect judge about synchronization location due to the channel fading or noise. The invention can be applied to wire/wireless communications or digital video broadcasting-terrestrial systems, specialized in symbol synchronization at a receiving end.

17 Claims, 7 Drawing Sheets

SYNCHRONIZATION METHOD AND APPARATUS FOR OFDM SYSTEMS

FIELD OF THE INVENTION

The present invention generally relates to the transmission of an orthogonal frequency division multiplexing (OFDM) system, and more specifically to a method and an apparatus for the synchronization of the OFDM systems using guard interval.

BACKGROUND OF THE INVENTION

In digital communication or broadcasting, the transmission end transmits information in the form of electromagnetic wave through a physical channel, such as air, to the receiving end. Due to the non-ideal channel effect, such as multi-path reflection and signal fading, there is usually distortion at the receiving end. Because the OFDM based on the multi-carrier modulation is effective in handling the multi-path reflection problem, it is becoming a mainstream technology in the wire/wireless communications and digital broadcasting-terrestrial systems.

The OFDM applications include: asymmetric digital subscriber line (ADSL), very-high-speed digital subscriber line (VDSL), digital audio broadcasting (DAB), wireless local area network (WLAN) IEEE802.11a/g/n, Ultra Wideband (UWB), dedicated short range communication (DSRC), integrated service digital broadcasting-terrestrial (ISDB-T), digital video broadcasting-terrestrial broadcasting (DVB-T), and digital video broadcasting-handheld (DVB-H), and so on.

Figure 1:
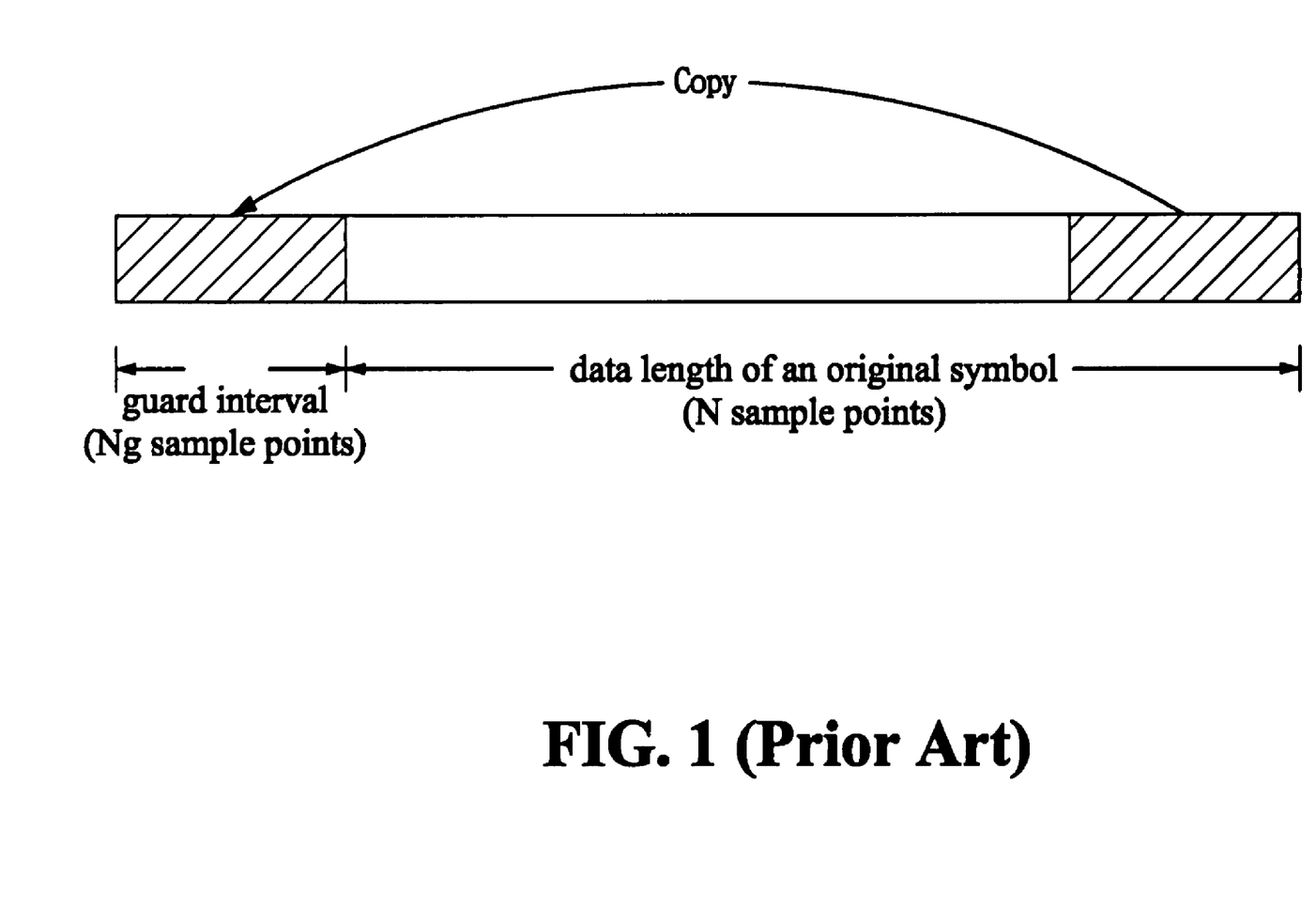
FIG. 1 shows a schematic view of the cyclic prefix characteristics of the guard interval of a typical OFDM system.

The output signals from the OFDM transmission end will have a guard interval with cyclic prefix placed in front of each symbol to fight against the inter-symbol interference (ISI) caused by the multi-path effect. FIG. 1 shows a complete OFDM symbol, in which the guard interval includes Ng sample points, and the original symbol includes N sample points; therefore the length of the symbol is N+Ng. The European TV transmission defines the 2K mode and the 8K mode of the original symbol length, combined with four different guard interval lengths, including $\frac{1}{32}$, $\frac{1}{16}$, $\frac{1}{8}$, and $\frac{1}{4}$ of the original symbol length for protection in different transmission environments.

Before processing the data, the OFDM receiving end must remove the data of the guard interval interfered by the ISI in order to extract correct effective data range to perform the Fast Fourier Transform (FFT) of the corresponding length (2K or 8K mode). If the extracted data range is interfered by ISI, the following data will all be affected by a phase difference. This may prolong the time required for decoding the symbol, or even corrupt the following data beyond decoding. It is therefore important to provide an effective symbol synchronization method.

The current symbol synchronization methods are divided into three categories. The first category includes methods, based on the repetition characteristics of the guard interval data, using correlation computation to analyze the correlation magnitude for processing. The second category includes methods, based on the repetition characteristics of the guard interval data, using correlation computation to analyze the correlation phase for processing. The third category includes methods combining the above two characteristics.

U.S. Pat. No. 6,421,401 disclosed a method based on cyclic prefix of the guard interval, combing delay conjugate multiplication and moving average techniques to process the data with two passes of delay correlation computation and observe the magnitude of the generated characteristics signal to find the maximum position as the output. This method analyzes the correlation magnitude for processing.

U.S. Pat. No. 5,991,289 disclosed a method based on cyclic prefix of the guard interval, combing delay conjugate multiplication and moving average techniques to process the data with delay multiplication to extract the phase difference and a moving sum to generate the characteristics signal, and then observe the transition position of the phase difference as the output. This method has the drawback of being easily affected by the channel decay or noise to misjudge the synchronization position.

US. Patent publication No. 2004/0,208,269 disclosed a method using correlation magnitude and correlation phase. After extracting, the correlation magnitude is multiplied with the correlation phase, passed through a self-parameter filter, and computed with a delay correlation computation, the transition position of the characteristics signal is observed as output. This method has the drawback of high complexity.

SUMMARY OF THE INVENTION

The present invention overcomes the disadvantages of the aforementioned conventional OFDM synchronization systems. The first object of the present invention is to provide a synchronization method for an OFDM system. The present invention uses the cyclic prefix characteristics of the guard intervals as the basis, and uses the delay conjugate multiplication, phase processing, delay moving sum and minimum value detection techniques for correlation phase computation to be used by the receiving end for symbol synchronization coarse tuning.

The synchronization apparatus of the present invention includes a delay conjugate multiplication module, a phase processing module, a delay moving sum module and a minimum value detector.

Based on the apparatus, the synchronization method includes the following steps. First, the delay conjugate multiplication operation is performed on the received signal to generate a delay conjugate multiplication signal. Then, the phase computation is performed on the delay conjugate multiplication signal to obtain a differential phase absolute value signal. The delay moving sum operation crossing at least a symbol is performed on the differential phase signal to obtain a delay moving sum signal. Finally, the transition of the phase difference of the delay moving sum signal is found for using in symbol synchronization.

The method and apparatus of the present invention have the advantages of anti-noise, anti-interference caused by channel effect and multi-path, and high precision. The present invention not only prevents the conventional misjudge of synchronization caused by fading and noise effect, the present invention also improves the overall effectiveness, and is applicable to digital audio and video broadcasting systems.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 2:
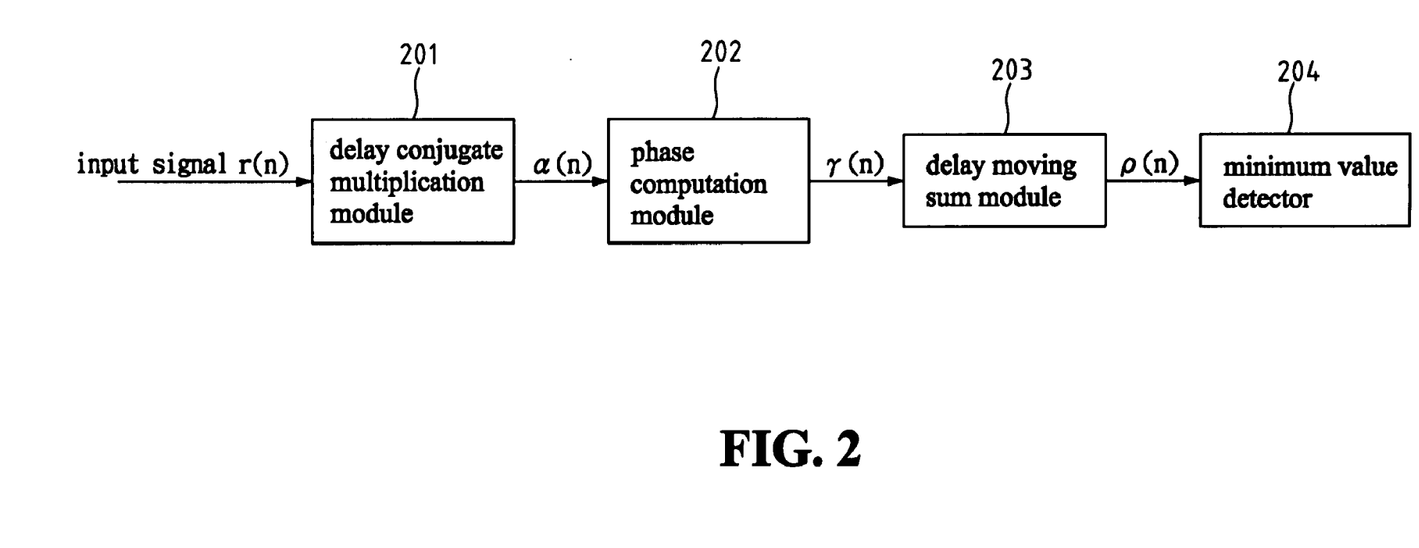
FIG. 2 shows a block diagram of an embodiment of the OFDM synchronization apparatus of the present invention.

FIG. 2 is a block diagram of the synchronization apparatus for the OFDM system. As shown in FIG. 2, the apparatus includes a delay conjugate multiplication module 201, a phase computation module 202, a delay moving sum module 203 and a minimum value detector 204.

Delay conjugate multiplication module 201 performs the time delay on the received signal r(n), extracts the conjugate value, and multiply with the received signal r(n) to obtain a delay conjugate multiplication signal $\alpha(n)$. Delay conjugate multiplication signal $\alpha(n)$ passes through phase computation module 202 to obtain a differential phase absolute value signal $\gamma(n)$. Differential phase absolute value signal $\gamma(n-i)$ passes through delay moving sum module 203 for a delay moving sum computation crossing at least a symbol to obtain a delay moving sum signal $\rho(n)$, with i as an index. Delay moving sum signal $\rho(n)$ passes through minimum value detector 204 to find a transition location $\Gamma$ of the phase difference for using in the synchronization of OFDM symbols.

Figure 3:
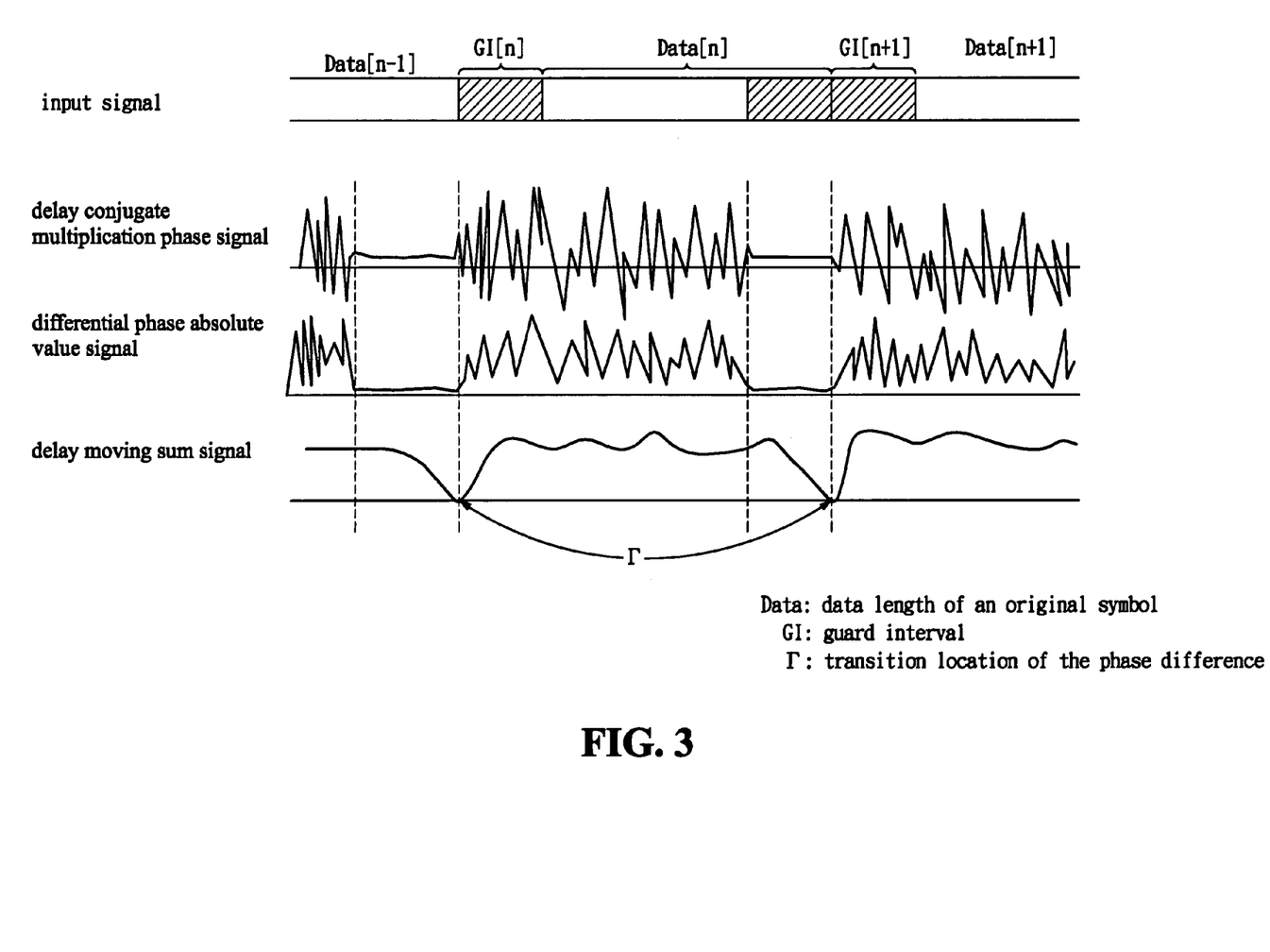
FIG. 3 shows a waveform of the related signals of FIG. 2.

FIG. 3 shows a waveform of the related signals in FIG. 2. As shown in FIG. 3, the locations of the relative minimum value of delay moving sum signal $\rho(n)$ is the transition location $\Gamma$ of the phase difference, which is also the reference location $\Gamma$ for the synchronization of OFDM symbols.

The following describes the elements and the flowchart of the modules of FIG. 2.

Figure 4:
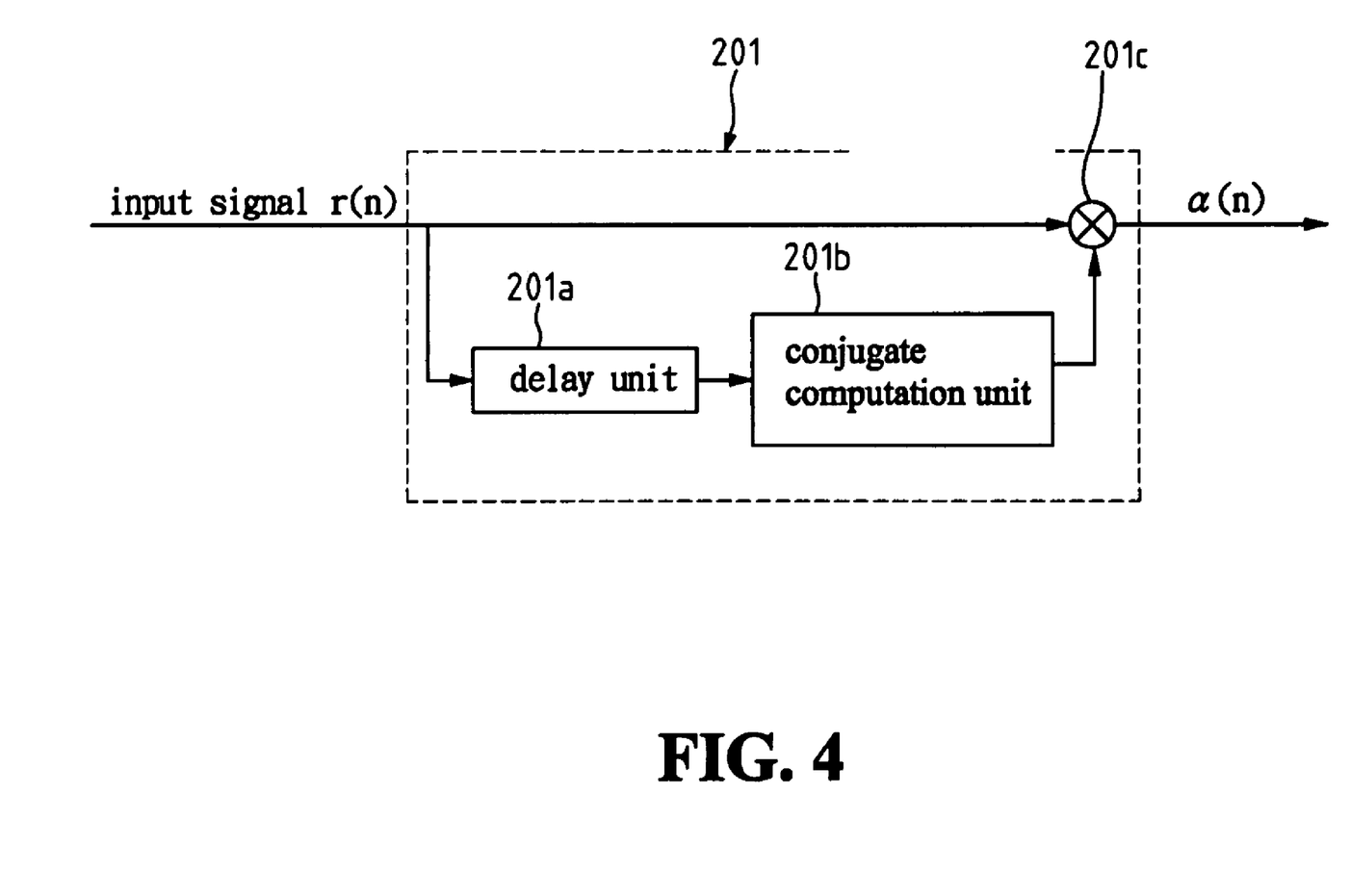
FIG. 4 shows the elements and flowchart of the delay conjugate multiplication module.

FIG. 4 shows the elements and the operation flowchart of the delay conjugate multiplication module. As shown in FIG. 4, delay conjugate multiplication module 201 includes a delay unit 201a, a conjugate computation unit 201b, and a multiplier 201c. The operation delay conjugate multiplication module 201 is described as follows.

Delay unit 201a performs a time delay on received signal r(n) to generate a time delay signal. The duration of the delay is the original data length N of the symbol. The time delay signal passes through conjugate computation unit 201b to extract a conjugate value and a time delay conjugate signal is obtained. The delay conjugate signal is multiplied with received signal r(n) by multiplier 201c to generate a delay conjugate multiplication signal $\alpha(n)$, where $$\alpha(n)=r(n-i)\cdot r^*(n-i-N) \quad (1)$$

n is time index and i is index.

Figure 5:
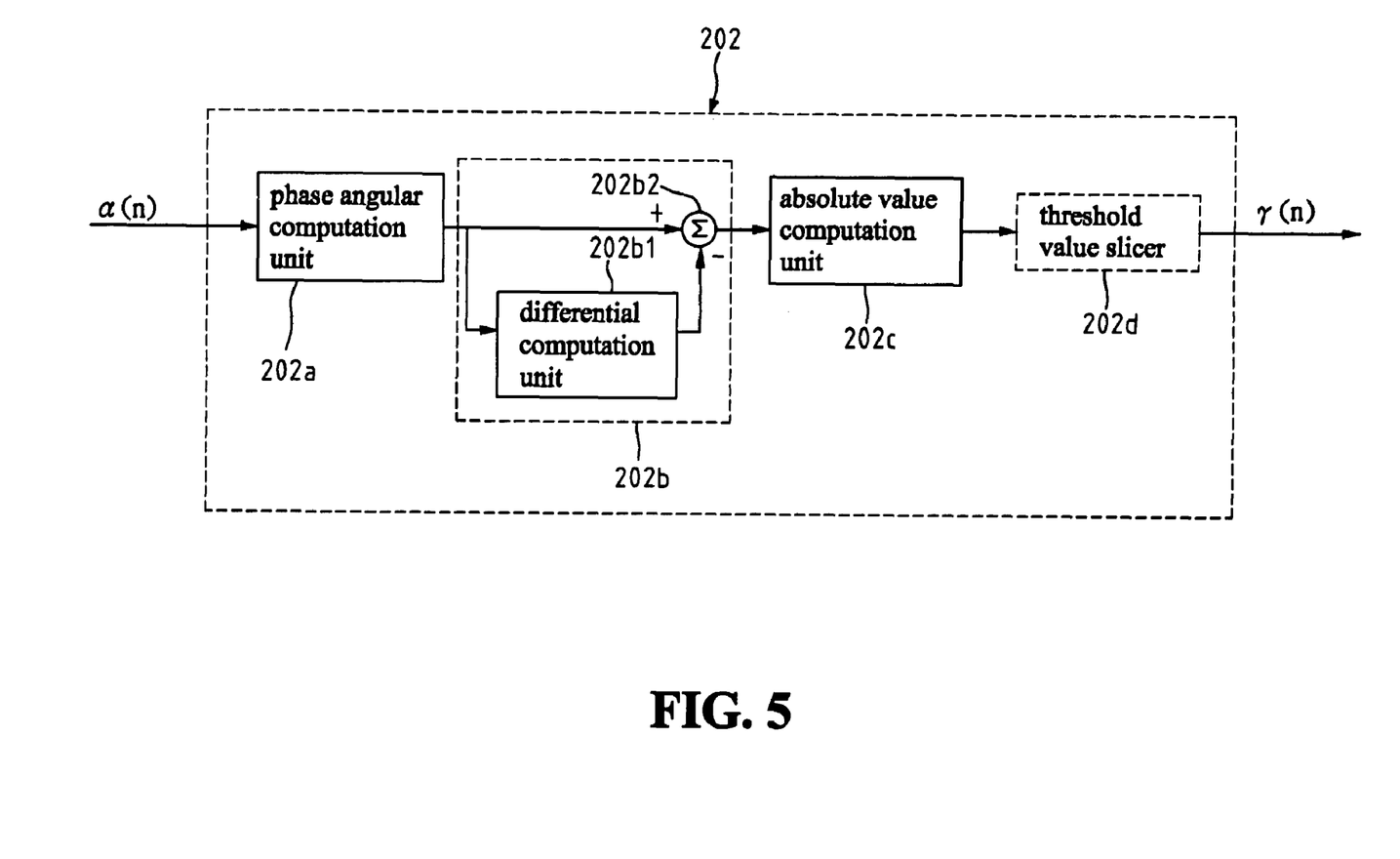
FIG. 5 shows the elements and flowchart of the phase computation module.

FIG. 5 shows the elements and the flowchart of the phase computation module. As shown in FIG. 5, phase computation module 202 includes a phase angular computation unit 202a, a differential computation unit 202b, an absolute value computation unit 202c, and a threshold value slicer 202d. Differential computation unit 202b further includes a differential delay unit 202b1 and a differential subtractor 202b2. The operation of phase computation module 202 is described as follows.

Delay conjugate multiplication signal $\alpha(n)$ passes through phase angular computation unit 202a of phase computation module 202 for extracting phase angle to obtain a delay conjugate multiplication phase angle $\beta(n)$.

$$\beta(n)=ARG[\alpha(n)] \quad (2)$$

where ARG is the phase extraction computation.

Delay conjugate multiplication phase angle $\beta(n)$ passes through differential computation unit 202b of phase computation module 202 for pre-post sample differential computation to obtain a differential phase signal. Differential computation unit 202b can be implemented with differential delay unit 202b1 and differential subtractor 202b2. Delay conjugate multiplication phase angle $\beta(n)$ passes through differential delay unit 202b1 for time delay to obtain a delay conjugate multiplication phase angle $\beta(n-1)$ of the previous sampling point. The duration of the delay is the length of a sampling interval. Subtractor 202b2 subtracts delay conjugate multiplication phase angle $\beta(n-1)$ of the previous sampling point from delay conjugate multiplication phase angle $\beta(n)$ to obtain a differential phase signal. The differential phase signal passes through absolute value computation unit 202c to obtain a differential phase absolute value signal $\gamma(n)$.

$$\gamma(n)=|\beta(n)-\beta(n-1)| \quad (3)$$

After the absolute value computation, threshold value slicer 202d can be used to change the differential phase signal $\gamma(n)$ higher than a threshold to a high value, and change the differential phase signal $\gamma(n)$ lower than a threshold to a low value. Hence, the differential phase signal $\gamma(n)$ can be expressed with a single bit to simplify the design complexity.

Figure 6:
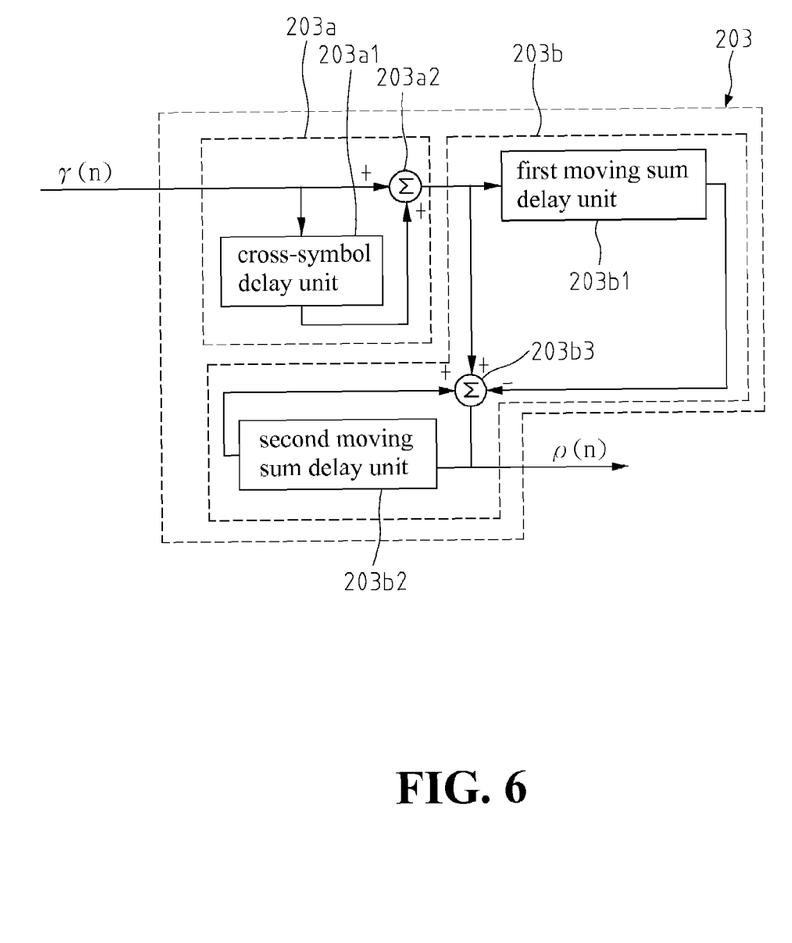
FIG. 6 shows the elements and flowchart of the delay moving sum module.

FIG. 6 shows the elements and flowchart of the delay moving sum module. As shown in FIG. 6, delay moving sum module 203 includes a cross-symbol delay adder 203a, and a moving sum unit 203b. Cross-symbol delay sum unit 203a further includes a cross-symbol delay unit 203a1 and a cross-symbol adder 203a2. Moving sum unit 203b further includes a first moving sum delay unit 203b1, a second moving sum delay unit 203b2 and a moving sum adder-subtractor 203b3. The operation of delay moving sum module 203 is described as follows.

Differential phase signal $\gamma(n-i)$ passes through delay moving sum module 203 for cross S-symbols delay sum computation to obtain a delay moving sum signal $\rho(n)$, with S being at least 1 and $$\rho(n) = \sum_{i=1}^{Ng} \sum_{s=1}^{S} \{\gamma(n-i-sL)\} \quad (4)$$

where S=1, 2, 3, 4 . . . , K and S is a natural number, L=N+Ng, L is the length of symbol data, which is the sum of length of guard interval Ng and the original data length N.

When S is 1, the meaning of equation (4) is that the differential phase absolute value signal $\gamma(n)$ of the current symbol must be summed with the differential phase absolute value signal $\gamma(n-L)$ of the previous symbol by cross-symbol delay sum unit 203a to obtain a cross-symbol delay sum signal.

Cross-symbol delay sum unit 203a can be implemented with a cross-symbol delay unit 203a1 and a cross-symbol adder 203a2. Differential phase absolute value signal $\gamma(n)$ passes through S cross-symbol delay units 203a1 for the time delay of the duration of the total length of one to S symbols to generate S cross-symbol delay signals. Differential phase absolute value signal $\gamma(n)$ and the S cross-symbol delay signals are summed by cross-symbol adder 203a2 to obtain a cross-symbol delay sum signal.

The cross-symbol delay sum signal passes through moving sum unit 203b for moving sum computation to obtain a delay moving sum signal ρ(n). Moving sum unit 203b can be implemented with a first moving sum delay unit 203b1, a second moving sum delay unit 203b2 and a moving sum adder-subtractor 203b3. First moving sum delay unit 203b1 performs the time delay on cross-symbol delay sum signal to obtain a moving delay sum signal. The delay duration is the length of a guard interval. Second moving sum delay unit 203b2 performs time delay on the moving delay sum signal to obtain a delay moving sum signal of the previous sample point. The delay duration is the length of a sampling. Moving sum adder-subtractor 203b3 adds the cross-symbol delay sum signal to the delay moving sum signal of the previous sampling point and subtracts the moving delay sum signal to obtain a delay moving sum signal ρ(n).

As shown in FIG. 3, the location of relative minimum value of delay moving sum signal ρ(n) is the phase difference transition location 64 of delay moving sum signal ρ(n) found by minimum value detector 204. Γ is also the reference location for the synchronization of OFDM symbols. Minimum value detector 204 can be implemented with a local minimum value detecting circuit or a peak detecting circuit. The former finds the minimum value of delay moving sum signal ρ(n) of the interval regularly for a fixed interval. The latter detects delay moving sum signal ρ(n), all the time, for a high-to-low or a low-to-high transition to find the relative minimum value of delay moving sum signal ρ(n).

Figure 7:
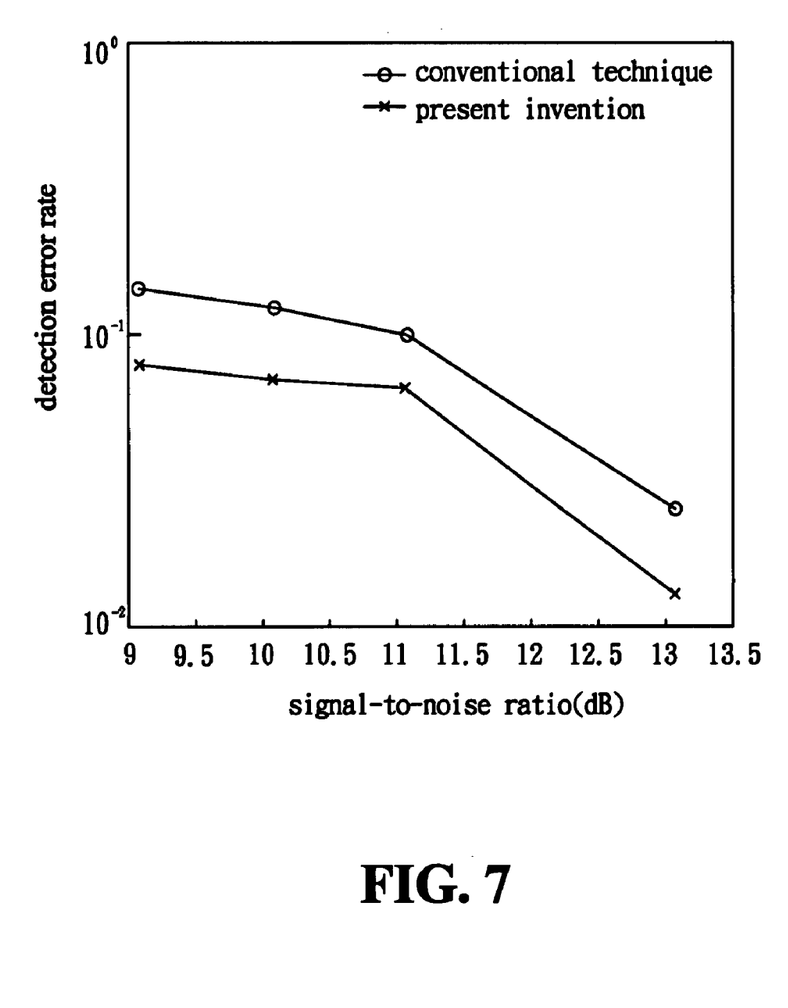
FIG. 7 shows a schematic view of the simulated results of the present invention and the conventional technologies.

FIG. 7 shows the simulated results of the present invention and the conventional techniques in an environment of a rural channel. The rural channel has the bandwidth of 6 MHz, with the 2K mode for symbol length, the guard interval being 1/32 of the symbol length. The sampling frequency shift is 40 ppm and the carrier frequency shift is 12.36 sub-carrier spacings. As shown in FIG. 7, the present invention, in comparison with the conventional techniques, improves the efficiency by 1.5-1.8 dB.

In summary, the present invention provides a synchronization apparatus and method for an OFDM system, including four portions: delay conjugate multiplication, phase processing, delay moving sum and minimum value detection. The invention performs the correlation phase operation and finds out the location of abnormal change for the phase difference of the output signal. The location is used for the reference of symbol synchronization. It overcomes the problems of incorrect judge about synchronization location due to the channel fading or noise, and improves the efficiency.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for synchronization of an orthogonal frequency division multiplexing (OFDM) system, comprising:
    a delay conjugate multiplication module, performing a time delay on an input signal at a receiving end of said system to generate a delayed signal, extracting a conjugate value of said delayed signal, and multiplying said conjugate value with said input signal to obtain a delay conjugate multiplication signal;
    a phase computation module, performing a phase computation of said delay conjugate multiplication signal to obtain a differential phase absolute value signal;
    a delay moving sum module, processing said differential phase absolute value signal for a delay moving sum computation crossing at least two symbols to obtain a delay moving sum signal; and
    a minimum value detector, for finding a transition location of phase difference of said delay moving sum signal for synchronization of symbols of said OFDM system;
    wherein said delay moving sum module generates a cross-symbol delay sum signal, performs a first delay moving sum operation on said cross-symbol delay sum signal with a time delay of a guard interval, and then performs a second delay moving sum operation with a time delay of a sampling interval to generate said delay moving sum signal.

2. The apparatus as claimed in claim 1, wherein said delay conjugate multiplication module further comprises:
    a delay unit, performing a time delay on said input signal to generate said delayed signal, with a duration of said time delay being an original data length of a symbol;
    a conjugate computation unit, extracting said conjugate value of said delayed signal to generate a delay conjugate signal; and
    a multiplier, multiplying said delay conjugate signal with said input signal to generate said delay conjugate multiplication signal.

3. The apparatus as claimed in claim 1, wherein said phase computation module further comprises:
    a phase angular computation unit, extracting a phase angle from said delay conjugate multiplication signal to obtain a delay conjugate multiplication phase signal;
    a differential computation unit, performing differential computation of previous and post samples on said delay conjugate multiplication phase signal to obtain a differential phase signal; and
    an absolute value computation unit, performing absolute value computation on said differential phase signal to obtain said differential phase absolute value signal.

4. The apparatus as claimed in claim 3, wherein said differential computation unit further comprises:
    a differential delay unit, performing a time delay of duration of a sampling interval on said delay conjugate multiplication phase signal to obtain a previous delay conjugate multiplication phase signal; and
    a differential subtractor, subtracting said previous delay conjugate multiplication phase signal from said delay conjugate multiplication phase signal to obtain a differential phase signal.

5. The apparatus as claimed in claim 1, wherein said phase computation module further comprises:
    a phase angular computation unit, extracting a phase angle from said delay conjugate multiplication signal to obtain a delay conjugate multiplication phase signal;
    a differential delay unit, performing a time delay of duration of a sampling interval on said delay conjugate multiplication phase signal to obtain a previous delay conjugate multiplication phase;
    a differential subtractor, subtracting said previous delay conjugate multiplication phase signal from said delay conjugate multiplication phase signal to obtain a differential phase signal; and
    an absolute value computation unit, performing absolute value computation on said differential phase signal to obtain said differential phase absolute value signal.

6. The apparatus as claimed in claim 1, wherein said phase computation module further comprises a threshold value slicer, for comparing said differential phase absolute value signal with a threshold to simplify the representation of said differential phase absolute value signal to a single bit.

7. The apparatus as claimed in claim 1, wherein said delay moving sum module further comprises:
   a cross-symbol delay adder, performing cross-N-symbol delay sum on said differential phase absolute value signal to obtain a cross-symbol delay sum signal, where N is a natural number; and
   a moving sum unit, performing moving sum computation on said cross-symbol delay sum signal to obtain said delay moving sum signal.

8. The apparatus as claimed in claim 7, wherein said cross-symbol delay adder further comprises:
   N cross-symbol delay units, performing a time delay of duration one to N symbols on said differential phase absolute value signal to obtain N cross-symbol delay signals; and
   a cross-symbol adder, adding said differential phase absolute value signal and said N cross-symbol delay signals to obtain said cross-symbol delay sum signal.

9. The apparatus as claimed in claim 7, wherein said moving sum unit further comprises:
   a first moving sum delay unit, performing a time delay of a guard interval on said cross-symbol delay sum signal to obtain a moving delay sum signal;
   a second moving sum delay unit, performing a time delay of a sampling interval on said moving delay sum signal to obtain a previous delay moving sum signal; and
   a moving sum adder-subtractor, adding said cross-symbol delay sum signal to said previous delay moving sum signal and subtracting said moving delay sum signal to obtain said delay moving sum signal.

10. A method for synchronization of an orthogonal frequency division multiplexing (OFDM) system, comprising the steps of:
   (a) performing delay conjugate multiplication by delay conjugate multiplication module on an input signal at a receiving end of said system to obtain a delay conjugate multiplication signal;
   (b) a phase computation of said delay conjugate multiplication signal to obtain a differential phase absolute value signal;
   (c) processing said differential phase absolute value signal for a delay moving sum computation crossing at least two symbols to obtain a delay moving sum signal; and
   (d) finding a transition location of phase difference of said delay moving sum signal for synchronization of symbols of said OFDM system;
   wherein said step (d) includes first generating a cross-symbol delay sum signal, performing a first delay moving sum operation on said cross-symbol delay sum signal with a time delay of a guard interval, and then performing a second delay moving sum operation with a time delay of a sampling interval to generate said delay moving sum signal.

11. The method as claimed in claim 10, wherein said step (a) further comprises the steps of:
   (a1) performing a time delay on said input signal to generate a time delay signal, with a duration of said time delay being an original data length of a symbol;
   (a2) extracting a conjugate value of said time delayed signal to generate a delay conjugate signal; and
   (a3) multiplying said delay conjugate signal with said input signal to generate said delay conjugate multiplication signal.

12. The method as claimed in claim 10, wherein said step (b) further comprises the steps of:
   (b1) extracting a phase angle from said delay conjugate multiplication signal to obtain a delay conjugate multiplication phase signal,
   (b2) performing differential computation of previous and post samples on said delay conjugate multiplication phase signal to obtain a differential phase signal; and
   (b3) performing an absolute value computation on said differential phase signal to obtain said differential phase absolute value signal.

13. The method as claimed in claim 12, wherein said step (b2) further comprises the steps of:
   (b21) performing a time delay of duration of a sampling interval on said delay conjugate multiplication phase signal to obtain a previous delay conjugate multiplication phase signal; and
   (b22) subtracting said previous delay conjugate multiplication phase signal from said delay conjugate multiplication phase signal to obtain a differential phase signal.

14. The method as claimed in claim 12, wherein said step (b3) is further followed by a step of comparing said differential phase absolute value signal with a threshold.

15. The method as claimed in claim 10, wherein said step (c) further comprises the steps of:
   (c1) performing cross-N-symbol delay sum on said differential phase absolute value signal to obtain a cross-symbol delay sum signal, where N is a natural number; and
   (c2) performing moving sum computation on said cross-symbol delay sum signal to obtain said delay moving sum signal.

16. The method as claimed in claim 15, wherein said step (c1) further comprises the steps of:
   (c11) performing a time delay of duration one to N symbols on said differential phase absolute value signal to obtain N cross-symbol delay signals; and
   (c12) adding said differential phase absolute value signal and said N cross-symbol delay signals to obtain said cross-symbol delay sum signal.

17. The method as claimed in claim 15, wherein said step (c2) further comprises the steps of:
   (c21) performing a time delay of a guard interval on said cross-symbol delay sum signal to obtain a moving delay sum signal;
   (c22) performing a time delay of a sampling interval on said moving delay sum signal to obtain a previous delay moving sum signal; and
   (c23) adding said cross-symbol delay sum signal to said previous delay moving sum signal and subtracting said moving delay sum signal to obtain said delay moving sum signal.

* * * * *